US012078294B2

(12) United States Patent
Mary et al.

(10) Patent No.: US 12,078,294 B2
(45) Date of Patent: Sep. 3, 2024

(54) GAS CONTAINER EQUIPPED WITH AN ELECTRONIC MEASUREMENT DEVICE

(71) Applicant: L'Air Liquide, Société Anonyme pour l'Etude et l'Exploitation des Procédés Georges Claude, Paris (FR)

(72) Inventors: Alexis Mary, Boulogne-Billancourt (FR); Maximilien Bonamarte, Paris (FR); Philippe Rudnianyn, Villiers sur Orge (FR); Taraq Bechikhi, Livry sur Seine (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 295 days.

(21) Appl. No.: 17/570,660

(22) Filed: Jan. 7, 2022

(65) Prior Publication Data

US 2022/0214015 A1 Jul. 7, 2022

(30) Foreign Application Priority Data

Jan. 7, 2021 (FR) ....................................... 2100101

(51) Int. Cl.
*F17C 13/02* (2006.01)
*F17C 13/04* (2006.01)

(52) U.S. Cl.
CPC ............ *F17C 13/025* (2013.01); *F17C 13/04* (2013.01); *F17C 2201/0104* (2013.01);
(Continued)

(58) Field of Classification Search
CPC F17C 13/025; F17C 13/04; F17C 2201/0104; F17C 2205/0165;
(Continued)

(56) References Cited

U.S. PATENT DOCUMENTS

| | | | | |
|---|---|---|---|---|
| 7,114,510 B2 | 10/2006 | Peters et al. | | |
| 10,151,405 B1 * | 12/2018 | Tebebi | .................. | F16K 37/005 |

(Continued)

FOREIGN PATENT DOCUMENTS

| | | |
|---|---|---|
| DE | 20 2017 102422 | 7/2018 |
| EP | 2 918 892 | 9/2015 |

(Continued)

OTHER PUBLICATIONS

French Search Report for corresponding FR 2100101, Aug. 20, 2021.

*Primary Examiner* — Bob Zadeh
(74) *Attorney, Agent, or Firm* — Elwood L. Haynes

(57) ABSTRACT

The invention relates to a gas container having a gas distribution valve and an electronic measurement device arranged on the gas distribution valve. The electronic measurement device having an electronic display screen which is electrically connected, via an electrical connecting connector, to a circuit board having at least one microprocessor. The electrical connecting connector having a connector body in the shape of an elongate bar through which a plurality of electrically conductive elements passes extending between two opposite faces of the connector body. The electrically conductive elements are separated from one another by regions made of insulating material.

10 Claims, 4 Drawing Sheets

(52) U.S. Cl.
CPC ................. *F17C 2205/0165* (2013.01); *F17C 2205/0308* (2013.01); *F17C 2205/0338* (2013.01); *F17C 2221/011* (2013.01); *F17C 2250/032* (2013.01); *F17C 2250/036* (2013.01); *F17C 2250/043* (2013.01); *F17C 2270/025* (2013.01)

(58) Field of Classification Search
CPC ...... F17C 2205/0308; F17C 2205/0338; F17C 2205/032; F17C 2205/036; F17C 2205/043; F17C 2221/011; F17C 2270/025; F17C 2250/032; F17C 2250/036; F17C 2250/043; F17C 2201/0109; F17C 2201/032; F17C 2201/056; F17C 2201/058; F17C 2205/0188; F17C 2205/0329; F17C 2205/0385; F17C 2221/014; F17C 2221/016; F17C 2221/017; F17C 2221/03; F17C 2223/0123; F17C 2223/036; F17C 2250/034; F17C 2250/0421; F17C 2250/0439; F17C 2250/0473; F17C 2265/04
USPC .......................................................... 222/157
See application file for complete search history.

(56) References Cited

U.S. PATENT DOCUMENTS

| | | | | |
|---|---|---|---|---|
| 10,837,814 | B1 * | 11/2020 | Huang | F17C 13/02 |
| 10,928,008 | B2 * | 2/2021 | Frenal | F17C 13/04 |
| 2010/0184309 | A1 * | 7/2010 | Huynh | H05K 3/325 702/57 |
| 2015/0260343 | A1 | 9/2015 | Baune et al. | |
| 2015/0260344 | A1 | 9/2015 | Frenal et al. | |

FOREIGN PATENT DOCUMENTS

| | | |
|---|---|---|
| EP | 2 918 893 | 9/2015 |
| EP | 3421866 A1 * | 1/2019 |
| FR | 3 079 027 | 9/2019 |

* cited by examiner

GAS CONTAINER EQUIPPED WITH AN ELECTRONIC MEASUREMENT DEVICE

CROSS REFERENCE TO RELATED APPLICATIONS

This application claims the benefit of priority under 35 U.S.C. § 119 (a) and (b) to French Patent Application No. 2100101, filed Jan. 7, 2021, the entire contents of which are incorporated herein by reference.

BACKGROUND

The invention relates to a pressurized gas container, in particular a pressurized gas cylinder; comprising a gas distribution valve equipped with an electronic measurement device, preferably protected by a protective covering, the electronic measurement device comprising a digital display which is preferably housed in an opening made in the body of the protective covering.

Pressurized fluid containers, such as pressurized gas tanks or cylinders, are commonly equipped with a valve for distributing fluid, with or without an integrated pressure-regulating system, and with a protective covering, also called a cap, which serves to protect the valve for distributing gas from impacts, falls, soiling, etc.

Thus, document EP-A-2918893 proposes a gas cylinder equipped with a valve with an integrated pressure regulator or IPR protected by a rigid covering comprising a plurality of openings providing access to various members or elements of the valve located in the internal volume of the covering, for example to one or more or gas inlet or outlet end fittings or connectors of use when filling the cylinder when it is empty or, conversely, when drawing gas when a user is using the gas. A pressure gauge is arranged in the upper half, or upper portion, of the covering so as to provide the user with an indication of the pressure of the gas.

Additionally, EP-A-2918892 proposes a covering similar to the above except that the pressure gauge has been replaced with an electronic device with a digital (i.e. electronic) display screen, commonly called an electronic display screen. According to EP-A-3002498, the electronic display screen may be a touchscreen.

Such an electronic display screen is supplied with power by one or more electric batteries or cells.

Additionally, the electronic display screen is connected to a circuit board with microprocessor, used in particular to perform calculations and to control what is displayed on the electronic display screen. Typically, the electrical connection from the electronic display screen to the circuit board is made via a ribbon, i.e. a flat electrical connection strip comprising several tens of electrical wires arranged in parallel, for example 40 or 80 wires, and with its free ends ending in connectors.

However, an electrical connection ribbon is quite bulky due to its strip structure and the presence of the two connectors at its ends, while the space available within an electronic measurement device with electronic display screen including a circuit board with microprocessor and fitted to a gas container, in particular a pressurized gas cylinder, is limited.

The problem is therefore that of being able to electrically connect the electronic display screen to the circuit board of a gas container electronic measurement device without using a ribbon.

SUMMARY

The solution of the invention thus pertains to a gas container, in particular a pressurized gas cylinder, comprising a gas distribution valve and an electronic measurement device arranged on said gas distribution valve, said electronic measurement device comprising an electronic display screen, also called a digital display, which is electrically connected, via an electrical connecting connector, to a circuit board comprising at least one microprocessor, i.e. a circuit board with one or more microprocessors, characterized in that the electrical connecting connector comprises a connector body in the shape of an elongate bar through which a plurality of electrically conductive elements passes extending between two opposite faces of said connector body, said electrically conductive elements being separated from one another by regions, or spacer zones, made of insulating material.

Depending on the embodiment in question, the container of the invention can comprise one or more of the following features:

- the connector is a connector of Zebra™ type.
- the connector body is linear in shape, and preferably a rectangular parallelepiped.
- the connector body comprises at least 10 electrically conductive elements, preferably at least 20 electrically conductive elements, typically from 20 to 40 electrically conductive elements, for example of the order of 30 electrically conductive elements.
- the electrically conductive elements are aligned, i.e. arranged in a row.
- the electrically conductive elements pass through the connector body, i.e. connect the two opposite faces of the connector body.
- the connector is arranged between the electronic display screen and the circuit board.
- the connector body is formed of at least one insulating material.
- the insulating material is a polymer, in particular an elastomer.
- the electrically conductive elements are formed of at least one electrically conductive material, typically a metal or metal alloy, for example copper, brass, gold, platinum or another metal,
- the electrically conductive elements form electrical connections connecting two opposite faces of the connector body.
- the connector is held by a support element.
- the support element is in the shape of a frame, i.e. a support frame.
- the support element forms or comprises a support frame additionally holding the electronic display screen.
- the electronic display screen is positioned in the support frame.
- the support element comprises securing means configured to secure, i.e. attach, the electronic display screen,
- the securing means comprise one or more stops.
- the securing means are arranged and/or configured to prevent any movement or displacement of the electronic display screen, in particular in translation or by pivoting (i.e. rotating).
- the support element is made of polymer, in particular of polyamide, for example PA66.
- the electronic measurement device comprises a casing containing the circuit board with microprocessor.
- the support element is secured to the electronic measurement device casing in such a way that the electronic display screen is flush with the surface of the casing, i.e. is visible from the exterior of the casing.

the support element comprises a frame arranged all the way around the periphery of the electronic display screen, i.e. the frame surrounds the peripheral edge of the screen.

the electronic display screen and the circuit board are electrically connected, i.e. coupled, to the electrically conductive elements at the two opposite surfaces of the connector.

it further comprises a protective covering arranged around the fluid distribution valve.

the electronic measurement device is housed in a first opening made in the body of the protective covering such that the display screen is oriented outwards and visible to a user.

the circuit board comprising at least one microprocessor, the casing further comprises control means, i.e. the circuit board forms part of control means.

the control means interact with the digital display in order to control/drive displaying on the display.

it further comprises at least one electrical power source supplying power to at least the digital display and the control means.

the display screen or digital display, e.g. A digital screen, comprises a window, preferably made of glass or of transparent polymer.

the casing is rigid and is, for example, made of polymer, i.e. of plastic.

the front panel and the screen form a human-machine interface or HMI.

the covering body defines an internal volume dimensioned to accommodate the gas-distributing valve.

the electrical power source comprises one or more electric batteries or cells, which might or might not be rechargeable.

the indicator light comprises one or more light-emitting diodes, in particular one or more LEDs, which might or might not be coloured.

at least one microprocessor is a microcontroller.

the microprocessor implements one or more algorithms.

at least one microprocessor is arranged on a circuit board.

the casing further comprises means for storing data or other information, in particular a data storage memory.

the data storage memory is arranged on the circuit board.

alternatively, information, for example alarm thresholds or other information, may be directly stored in one or more algorithms of the microprocessor, in particular of a microcontroller.

the electrical power source supplies power to the circuit board, in particular the microprocessor and/or the data storage memory.

the digital display is configured to display one or more items of information, in particular a remaining content (in hours and minutes), a gas flow rate value (in L/min), a graphic bar showing the remaining amount of gas, one or more pictograms or any other information of use to the user, in particular one or more alarms.

the control means are configured to control the sound and/or visual alerts.

the covering body is made of rigid material, in particular of polymer, metal or combinations thereof.

the covering body comprises one or more carrying handles; preferably the carrying handle is arranged so as to surmount the covering, i.e, it is located substantially on top of the covering.

the internal volume of the covering body is dimensioned so as to accommodate the gas distribution valve, such as a valve with an integrated pressure regulator or IPR.

the covering body further comprises a securing system designed to allow it to be secured to a support, in particular to a bar of a hospital bed or to a stretcher for carrying a patient or the like.

the covering body forms an overall closed three-dimensional structure comprising one or more openings.

it further comprises telecommunication means, i.e. means for remote communication, allowing the transmission or reception, or both, of data or other information, for example to or from a remote server.

the telecommunication means are configured to communicate in Bluetooth, Wi-Fi or another mode.

the telecommunication means comprise one or more modems and/or one or more transmitting antennas.

the telecommunication means are supplied with power, directly or indirectly, by the electrical power source, for example via a circuit board, it potentially comprises wired communication means, for example connectors or other means, used, for example, for maintenance operations or for updating installed software.

more generally, the electrical power source is electrically connected to the various components that require power to operate, for example the alert means, etc.

the electronic device comprises attachment means for attaching it to the gas distribution valve, for example threading or any other system for attachment by screwing or other means.

the fluid distribution valve is screwed to the container, in particular at a neck bearing the gas outlet orifice of said container.

the electronic device is mainly located beneath the protective covering, i.e. in the covering body.

the casing further comprises at least one pressure sensor and/or temperature sensor.

the casing is sealtight, and it preferably comprises seals.

the covering body comprises or is formed of two half-shells which are connected to one another.

the casing of the electronic device is sandwiched between the two half-shells.

the gas container is a pressurized gas cylinder, the gas container contains a gas or a mixture of gases under pressure, in particular a medical gas, such as oxygen.

the container contains a gas at a pressure of at least 150 to 200 bar abs, or even at least 300 bar abs.

the container is cylindrical, in particular ogival, in general shape.

the protective covering is arranged coaxially with the fluid container.

the fluid distribution valve is an IPR, i.e. a valve with an integrated pressure-regulating system.

the gas container contains a gas or a mixture of gases, such as oxygen, an $NO/N_2$, $O_2/N_2O$ or $He/O_2$ mixture, air or any other gas, in particular any other medical gas, the gas preferably being oxygen.

The invention also relates to the use of a gas container, in particular a gas cylinder, according to the invention, to store or supply a pressurized gas, in particular a gas or a mixture of gases, for example oxygen, an $NO/N_2$, $O_2/N_2O$ or $He/O_2$ mixture, argon, air or any other gas, in particular any other medical gas, the gas preferably being oxygen.

BRIEF DESCRIPTION OF THE DRAWINGS

The invention will now be better understood by virtue of the following detailed description, which is given by way of non-limiting illustration, and with reference to the appended figures, in which.

DETAILED DESCRIPTION OF PREFERRED EMBODIMENTS

Figure 1:
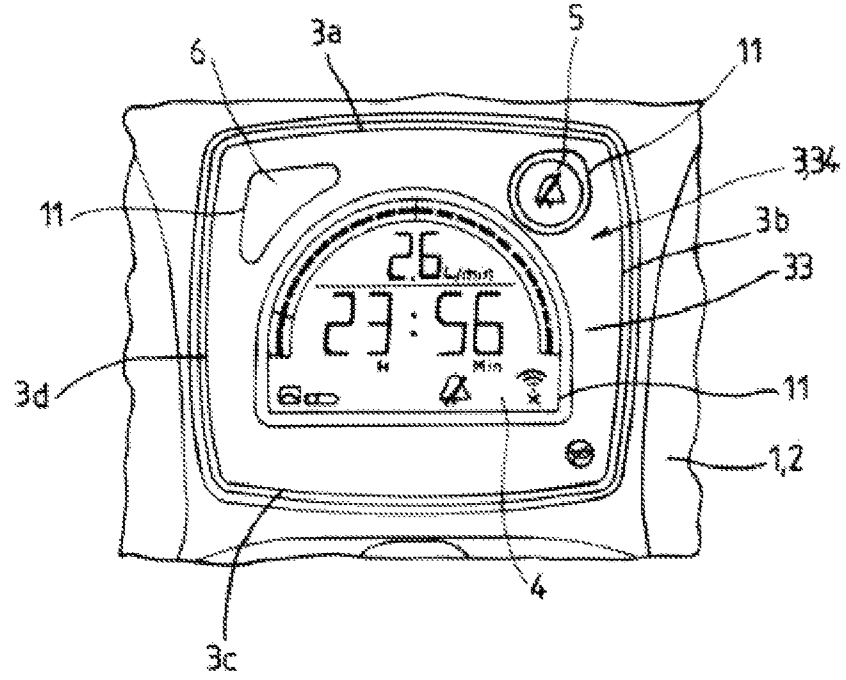
FIG. 1 shows one embodiment of the front panel with information display of an electronic device fitted to the valve of a gas container according to the invention, FIG. 2 schematically shows one embodiment of the information display of an electronic device fitted to a gas container according to the invention, FIG. 3 schematically shows a gas container according to the invention.

FIG. 1 shows one embodiment of a front panel 33 of a casing 34 of an electronic device 3 housed in the body 2 of the protective covering 1 of a gas container 20 according to the invention, comprising an information display 4 for displaying information, data, quantities, etc. of use to the user, in particular pressure, flow rate, remaining content, etc., and icons, alarms, etc.

Figure 2:
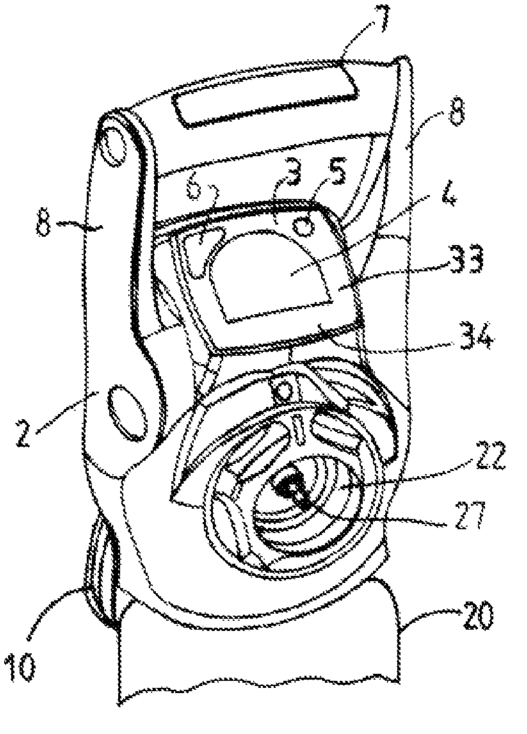
Figure 3:
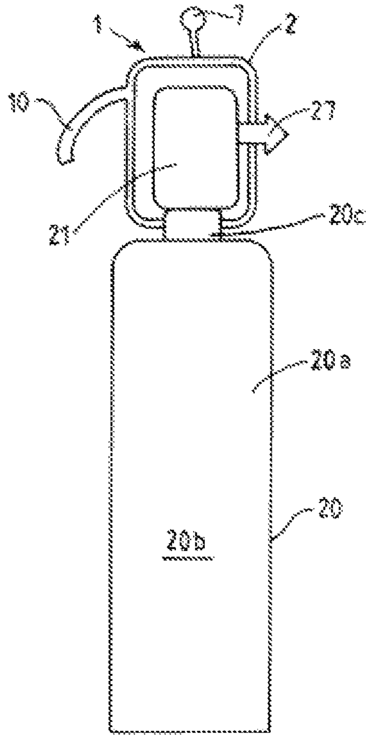

More precisely, as illustrated in FIG. 2 and FIG. 3, the gas container 20 is here a gas cylinder comprising a cylindrical body 20*a* defining an internal volume 20*b* for storing gas at high pressure, typically from 140 to 300 bar abs, or even beyond 300 bar abs, and a neck 20*c* comprising an orifice that is in communication with the internal volume 20*b* and allows the gas to be withdrawn from the internal volume 20*b* or, conversely, allows it to be filled when it is empty.

Figure 4:
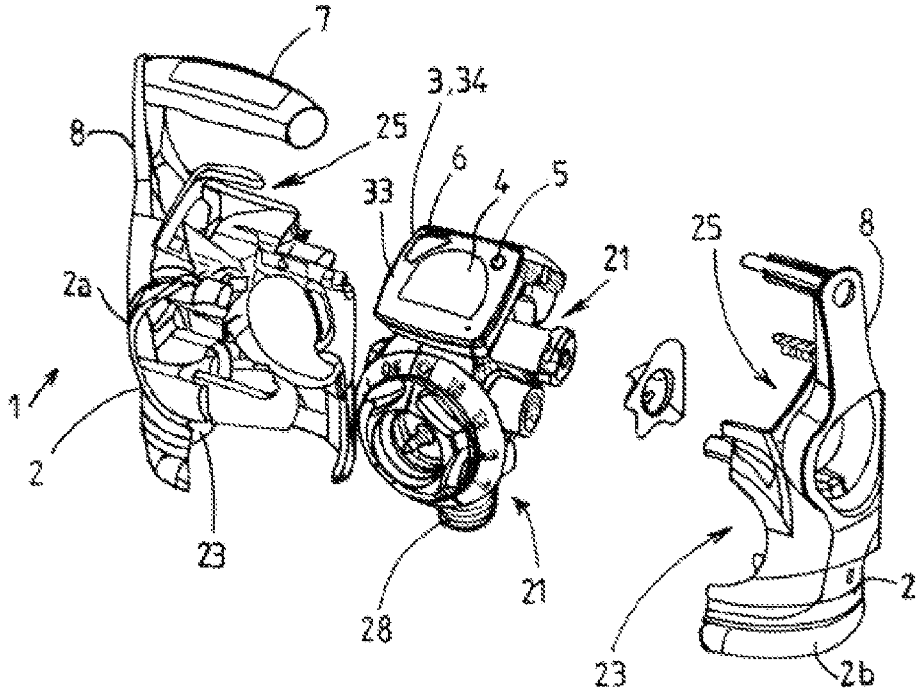
FIG. 4 is an exploded view showing the valve equipped with the electronic device and the protective covering of a gas container according to the invention.
Figure 5:
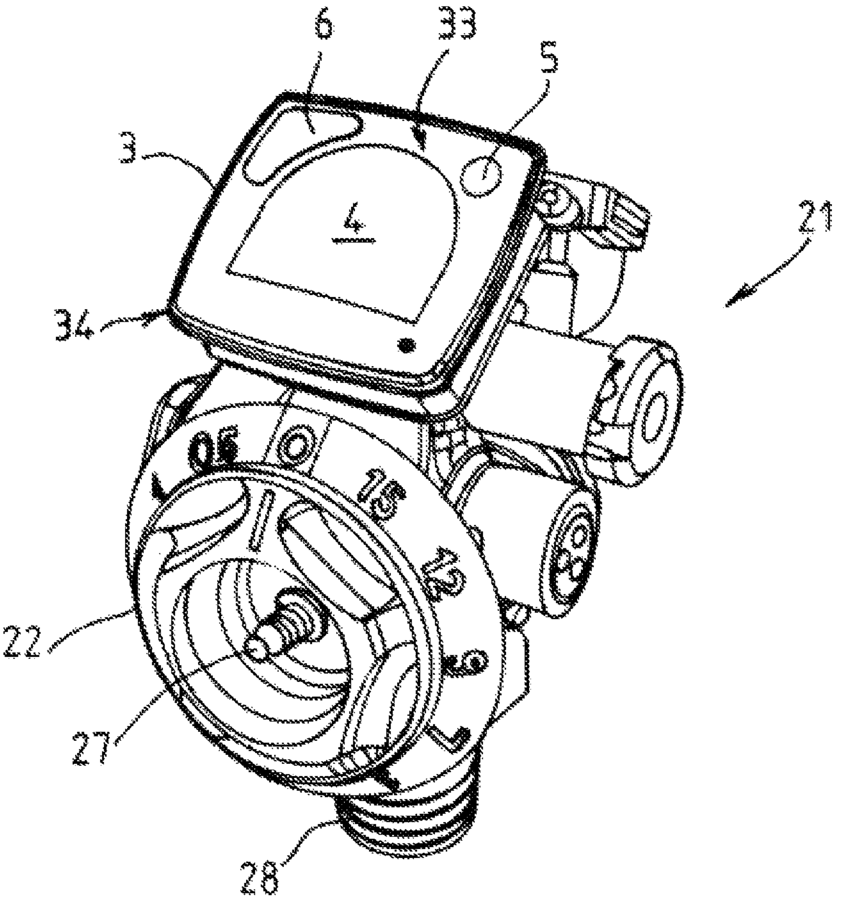
FIG. 5 shows the valve equipped with the electronic device of a gas container according to the invention, FIG. 6 schematically shows the process of connecting the display screen to the circuit board of an electronic device fitted to a gas container according to the invention, and FIG. 7 schematically shows a connector of Zebra™ type from FIG. 6.

A fluid distribution valve 21 preferably a valve with an integrated pressure regulator or IPR, visible in FIG. 4 and FIG. 5, is mounted, typically screwed via its threaded end fitting 28, at the orifice of the neck 20*c* of the gas container 20. It comprises a connector or end fitting 27 for distributing gas, to which an item of medical equipment or a flexible tube using or routing the gas delivered by the valve 21 may be connected. A member for adjusting the flow rate, namely here a rotary handwheel 22 arranged coaxially around the connector or end fitting 27 for distributing gas, allows a user to adjust the desired value of the gas flow rate.

The electronic device 3 is secured to the fluid distribution valve 21, as illustrated in FIG. 4 and FIG. 5.

A protective covering 1, also called a "cap", is arranged around the gas distribution valve 21 in order to protect it from impacts, dropping, dirt or the like. The protective covering 1 comprises a rigid body 2 which bears against and/or is attached to the gas distribution valve 21 and/or to the gas container 20.

In the embodiment of FIG. 4, the protective covering 1 is formed of a rigid body 2 formed of two sub-shells 2*a*, 2*b* which are connected and secured to one another while sandwiching the casing 34 of the electronic device 3 between them, i.e. they embrace it, such that it is housed in a first opening 25 of the covering 1 body 2. As can be seen, the two sub-shells 2*a*, 2*b* also sandwich the fluid distribution valve 21 between them. The two sub-shells 2*a*, 2*b* may be attached to one another and secured to one another by screws or the like.

The gas distribution end fitting 27 and the rotary handwheel 22 arranged around the end fitting 27 are housed in a second opening 23 also made in the rigid protective covering 1 body 2 so as to emerge at the external surface of said covering 1. The gas distribution end fitting 27 protrudes at the centre of the rotary handwheel 22 and projects outwards from the covering 1. Of course, the gas distribution end fitting 27 could be arranged elsewhere, i.e. independently of the rotary handwheel 22.

As visible in FIG. 4, the first opening 25 and the second opening 23 are, in the embodiment presented, formed "across" the two sub-shells 2*a*, 2*b*, i.e. one part of each opening 23, 25 is formed in one 2*a* of the sub-shells 2*a*, 2*b* and the rest is formed in the other 2*b* of the sub-shells 2*a*, 2*b*.

The body 2 of the protective covering 1, in particular its two sub-shells 2*a*, 2*b*, may be made of polymer or of metal or metal alloy, or both.

The protective covering 1 is arranged coaxially with the gas cylinder 20. It is provided with a carrying handle 7 connected to the covering body 2 by support uprights 8. The carrying handle 7 surmounts the covering body 2 and faces the front panel 33 of the electronic device 3, as visible in FIG. 2 or FIG. 4. The carrying handle 7 is dimensioned so as to be able to be gripped manually by a user in order to allow convenient handling and/or transport of the gas cylinder/IPR/covering assembly.

It is also provided with a movable, preferably pivoting, securing device or system 10 (partially visible in FIG. 2) that allows the gas cylinder/IPR/covering assembly to be secured to a support, such as a bar of a hospital bed, to a stretcher, to a rail or the like, as schematically shown in FIG. 3. Such a securing device or system 10 is known per se.

Additionally, the electronic device 3 is housed in the first opening 25 of the covering 1 body 2, comprises a rigid and sealtight casing 34, for example made of plastic, provided with the front panel 33 bearing the digital display 4, such as a digital screen, for example a liquid crystal display (LCD), etc., comprising a window and supplied with power by an electrical power source (not visible) arranged in the covering 1, for example one or more batteries or cells placed in a cell compartment made in the wall of the covering body 2 and closed by a removable flap or the like.

In the embodiment illustrated in FIG. 1, the digital display 4 is arranged substantially at the centre of the front panel 33 of the casing 34 of the electronic device 3. Additionally, the front panel 33 is generally rectangular in shape with slight curved peripheral edges 3*a*, 3*b*, 3*c*, 3*d*, namely an upper edge 3*a*, a lower edge 3*c* and two peripheral edges 3*b*, 3*d* connecting the upper 3*a* and lower 3*c* edges.

Such a configuration allows the ergonomics of the assembly of the display 4 to be enhanced while limiting its size and still not negatively affecting the ease of reading of the information that it displays for the user, and does so even when the casing 34 with the display 4 is integrated into the body 2 of the protective covering 1 fitted to the fluid container 20, e.g. a gas cylinder.

Advantageously, the digital display screen or digital display 4 comprises a digital screen, the height of which is preferably between 2.9 and 3.7 cm, and the width of which is between 3.9 and 4.3 cm. Generally, the digital display 4 allows all of the information of use to the user to be displayed, in particular a remaining content (in hours and minutes), a gas flow rate value (in L/min), an arc-shaped graphic bar showing the remaining amount of gas, pictograms, e.g. alarms, electric battery level, whether or not wireless communication is active, etc.

According to the invention, the front panel 33 of the casing 34 of the electronic measurement device 3 comprises, in addition to the display 4, a button 5 that is activated when a user presses it using their finger, such as their index finger, and an indicator light 6, such as an LED, which is also supplied with power by the electrical power source.

This assembly comprising the digital display 4, the button 5 and the indicator light 6 forms an HMI of the electronic measurement device which is housed in the upper portion of the covering 1, i.e. beneath the carrying handle 7 which surmounts the covering body 2, for better visibility for the user using the gas cylinder 20.

The external surface of the front panel 33, the digital display 4, typically its window, the button 5 and the indicator light 6 are preferably arranged in one and the same plane, i.e. they are substantially coplanar, in such a way as to be completely integrated into the body 2 of the covering 1, i.e. without any protruding shapes, and also both to facilitate the visibility and to enhance the comfort of use of the HMI for the user. For the same reasons, the plane of the front panel 33 preferably forms an angle of between 30 and 80° with the vertical axis (AA) of the covering body 2 and of the cylinder 20.

In the embodiment illustrated in FIG. 1, the digital display 4 is arranged substantially at the centre of the front panel 33 of the casing 34 of the electronic measurement device 3, while the button 5 and the indicator light 6, i.e. LED, are arranged above the digital display 4, i.e. in the upper region of the front panel 33 located between the digital display 4 and the upper edge 3*a* of the front panel 33. Preferably, the button 5 is arranged at the top right of the front panel 33 with respect to the digital display 4 and the indicator light 6 is arranged at the top left of the front panel 33 with respect to the digital display 4, or vice versa.

As can be seen in FIG. 1, the digital display 4, the finger-activated button 5 and the indicator light 6 are housed in cut-outs or openings 11 made in the front panel 33 of the casing 34.

Provision is additionally made for control means 60, 61 comprising a circuit board 60 on which is arranged one or more microprocessors 61, in particular a microcontroller, implementing one or more calculation algorithms or the like and preferably a data storage memory, which are supplied with power by the electrical power source, e.g. cells or batteries. This electrical power source may also supply power to other components that require electrical power to operate.

The control means 60, 61, in particular the circuit board 60 with one or more microprocessors 61, are arranged in the casing 34 of the electronic measurement device 3. As such, the casing 34 is preferably sealtight.

The control means 60, 61, in particular the microprocessor 61, make it possible to perform calculations, to control what is displayed on the digital display 4, to manage sound and/or visual (LED) alarms, including turning on the indicator light, etc.

Thus, the control means 60, 61 calculate, continuously or when they are called upon to do so by the user, certain monitoring parameters, such as the remaining amount of gas or the remaining pressure in the container 20 or else the remaining content (i.e. the time for which the device can continue to deliver gas before all of the stored gas is consumed), on the basis of measurements or through a determination of pressure and/or ambient temperature and/or of gas, etc., which are obtained, for example, by means of sensors arranged on or in the IPR (these are not shown) and/or from the draw rate set by the user by means of the rotary handwheel 22 and its position sensor 62, as explained above.

The actuation of the button 5 allows parameters of use to the user to be displayed on the digital display 4, for example flow rate/remaining time pairs or an amount of gas expressed in units of pressure or of volume. Pressing multiple times in succession makes it possible to scroll through different data, information or parameters on the digital display 4. The button 5 may also be used to stop the alarms.

In general, a fluid container 20, in particular a gas cylinder, equipped with a valve, such as an IPR, protected by a covering 1 according to the invention, is suitable for storing and supplying gas under pressure, in particular a medical gas or mixture of gases, such as oxygen, an $NO/N_2$, $O_2/N_2O$ or $He/O_2$ mixture, air, etc.

Figure 6:
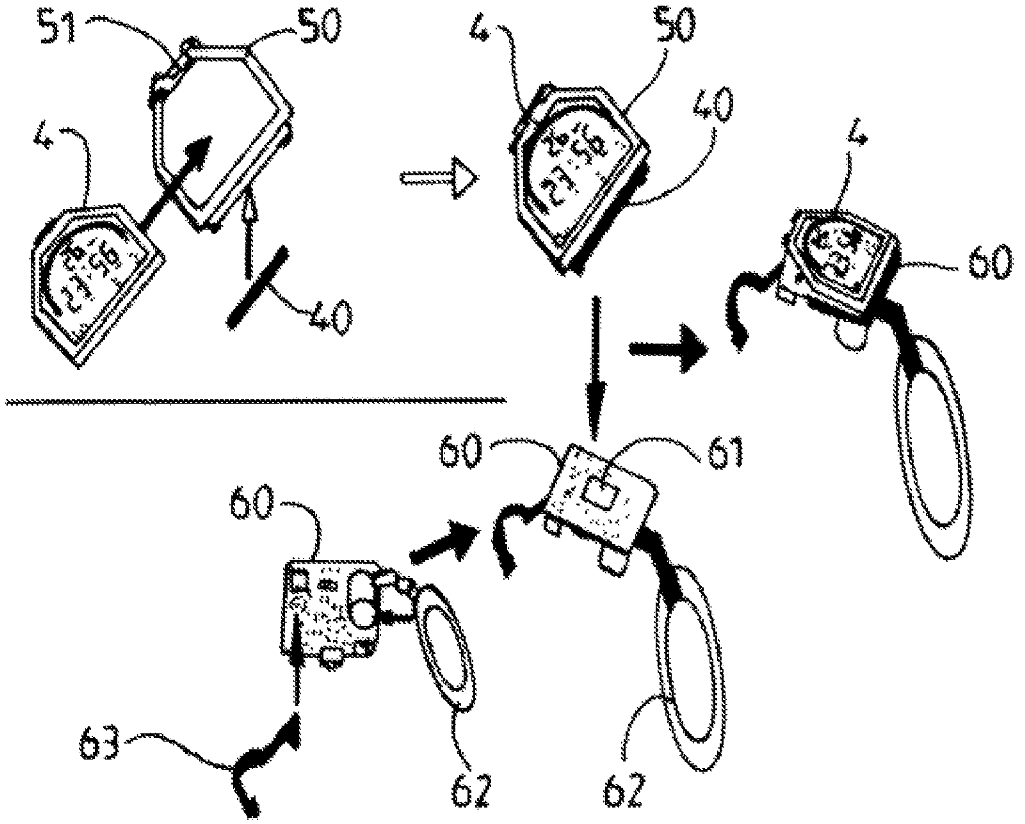
Figure 7:
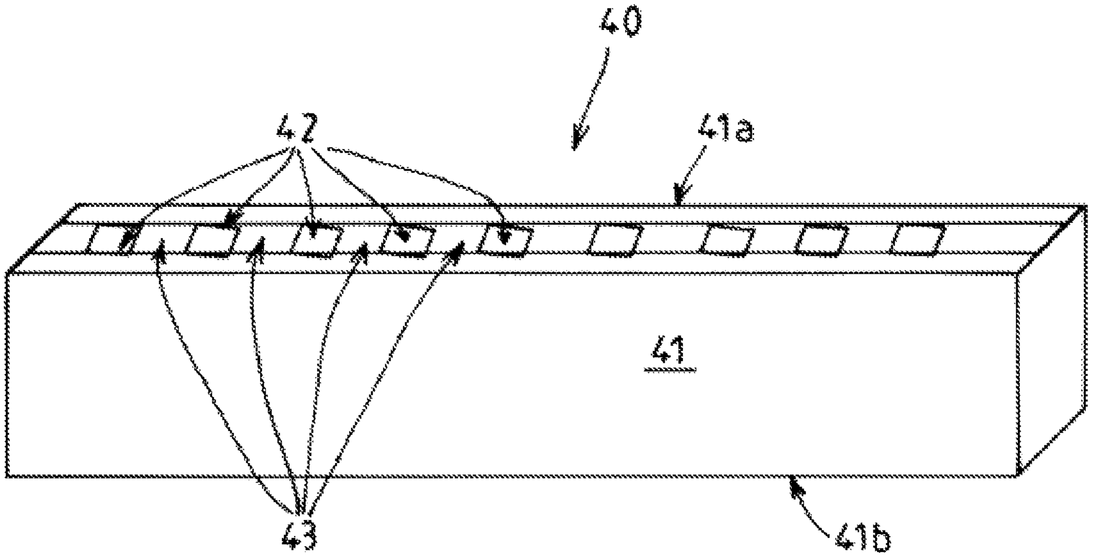

According to the invention, as illustrated in FIG. 6 and FIG. 7, in order to allow simple, effective and compact connection of the electronic display screen 4 to the circuit board 60 with microprocessor 61 within the casing 34 of the electronic measurement device 3, a special electrical connecting connector 40 is used, visible in FIG. 7.

More specifically, the electrical connecting connector 40 comprises a connector body 41 in the shape of an elongate bar, here in shape of a rectangular parallelepiped, through which a plurality of electrically conductive elements 42 passes, typically more than 10 electrically conductive elements 42, for example from 20 to 40 electrically conductive elements 42, for example of the order of 30 electrically conductive elements 42, which are aligned and extend between two opposite faces 41*a*, 41*b* of the connector body 41, i.e. they pass through the connector body 41.

The electrically conductive elements 42 are separated from one another by spacer zones or regions 43 made of insulating material, for example a non-conductive polymer, for example of elastomer type.

The electrically conductive elements 42 are themselves formed of an electrically conductive material, typically a metal or metal alloy, for example of copper or another metal or metal alloy which is suitable.

Preferably, the connector 40 is a connector of Zebra™ type.

As illustrated in FIG. 6, the connector 40 is arranged between the electronic display screen 4 and the circuit board 60 such that the electronic display screen 4 and the circuit board 60 are electrically connected to the electrically conductive elements 42 at the two opposite surfaces 41*a*, 41*b* of the connector 40.

In order to ensure good contact at any operating temperature, care is taken to ensure that the compression ratio for the connector 40 between display screen 4 and circuit board 60 is correct and sufficient, via a suitable mechanical support.

The advantages of such an electrical connecting connector with respect to a conventional connector of ribbon type are that it is much more compact and less bulky and, in addition, that it does away with one of the two connectors present at the opposite ends of a ribbon, while still providing an easy and effective electrical connection.

In the embodiment of FIG. 6, the connector 40 is held by a support element 50, and preferably at least part of the support element 50 is in the shape of a frame 51, i.e. is a support frame, which support element 50 additionally holds the electronic display screen 4.

In other words, the support element 50 comprises a frame 51 surrounding the periphery of the electronic display screen 4.

Securing means arranged on the support element 50 serve to secure and hold the electronic display screen 4, for example one or more stops, so as to prevent it from moving, in particular in translation or by pivoting/rotating.

As schematically shown in FIG. 6, the electronic display screen 4 and the connector 40 are first joined to the support element 50, i.e. to the support frame, and then this assembly 4, 40, 50 is attached to the circuit board 60 which bears the microprocessor 61, the electrical connection between the circuit board 60 and the electronic display screen 4 being provided by the connector 40 of Zebra™ type.

More specifically, the circuit board 60 comprises a microprocessor 61, typically a microcontroller, with pins or outputs which are aligned on the circuit board 60 and which then cooperate with the row of electrically conductive elements 42 of the connector 40 so that they are electrically connected to one another. These pins of the microcontroller 61 make it possible to control the display of the segments on the screen 4. The connector 40 of Zebra™ type provides the electrical connections between board 60 and screen 4, and therefore allows the display commands to be conveyed correctly to the segments of the display screen 4.

Preferably, the circuit board 60 comprises recesses for accommodating the attachment lugs, such as dips, borne by the support element 50, i.e. the support frame, which serve to attach, in particular by clipping, the circuit board 60 and the support element 50 to one another.

The obtained assembly may then be arranged in the casing 34 (not shown) of the electronic measurement device 3.

Such an assembly process is reliable and repeatable, which makes it possible to ensure the operational reliability of the electronic measurement device 3, i.e. continuous operation, in particular of the display screen 4, without electrical connection problems.

It should be noted that the circuit board 60 also bears other electronic components and/or elements that are essential to the operation of the electronic device 3, in particular a position sensor 62 for determining the position of the rotary handwheel 22 of the valve 21 in order to make it possible to determine the flow rate selected by the user, and a connection 63 for connecting the circuit board 60 to the cell or battery, and also for communication with the circuit board 6.

The circuit board 60 may also bear one or more data storage memories, and a communication module allowing transmission or exchange of data (i.e. transmission and/or reception), for example a module of BLE (i.e. Bluetooth™ Low Energy) type, or other components, such as one or more LEDs, a buzzer, a pressure sensor, a push-button as a user interface, in particular for acknowledging alerts, making selections, etc.

Generally, a pressurized gas cylinder according to the invention comprising a gas distribution valve equipped with an electronic measurement device and a protective covering is particularly well suited to the pressurized storage of medical oxygen.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A gas container comprising gas distribution end fitting, a rotary handwheel, a gas distribution valve and an electronic measurement device arranged on said gas distribution valve, said electronic measurement device comprising an electronic display screen which is electrically connected, via an electrical connecting connector, to a circuit board comprising at least one microprocessor, wherein the electrical connecting connector comprises a connector body in the shape of an elongate bar through which a plurality of electrically conductive elements passes extending between two opposite faces of said connector body, said electrically conductive elements being separated from one another by regions made of insulating material, wherein the rotary handwheel is configured to adjust the gas flow rate, and wherein the gas distribution end fitting protrudes through center of the rotary handwheel.

2. The gas container according to claim 1, wherein the connector body is linear in shape.

3. The gas container according to claim 1, wherein the electrical connecting connector is arranged between the electronic display screen and the circuit board.

4. The gas container according to claim 1, wherein the connector body is formed of at least one insulating material.

5. The gas container according to claim 1, wherein the electrical connecting connector is held by a support element.

6. The gas container according to claim 5, wherein the support element comprises or forms a support frame which additionally holds the electronic display screen.

7. The gas container according to claim 5, wherein the support element comprises securing means configured to secure the electronic display screen when the electronic display screen is positioned in the support frame.

8. The gas container according to claim 1, wherein the connector body comprises at least 10 electrically conductive elements.

9. The gas container according to claim 1, further comprising a protective covering arranged around the fluid distribution valve, the electronic measurement device being housed in a first opening made in the body of said protective covering.

10. The gas container according to claim 1, wherein the gas container comprises at least one gas cylinder and/or the fluid distribution valve is an integrated pressure regulator.

* * * * *